W. H. EDWARDS.
Wheel Cultivator.
No. 83,944.                           Patented Nov. 10, 1868.
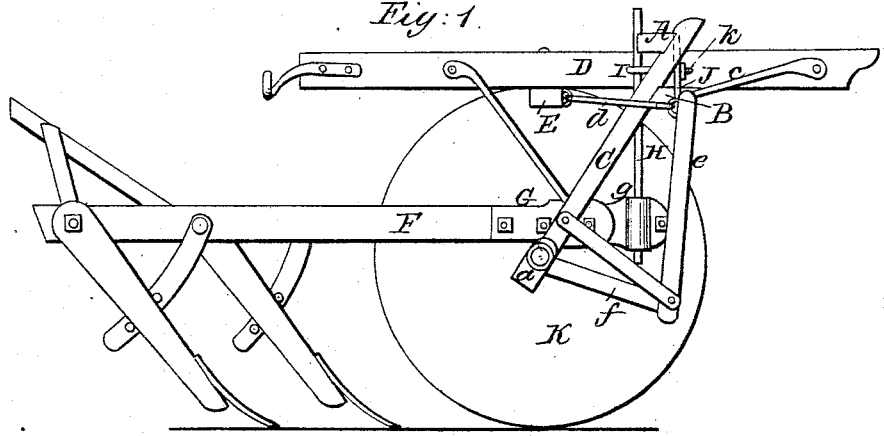
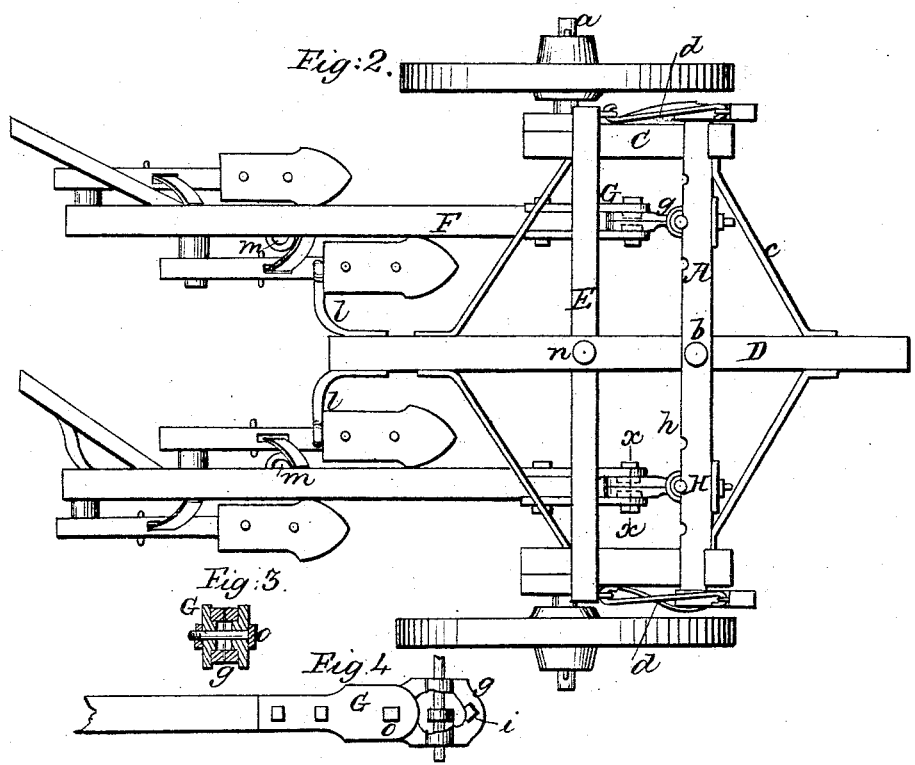
Witnesses
P. T. Dodge
L. Hailer
Inventor
W. H. Edwards
by Dodge & Munn
his Attys.

UNITED STATES PATENT OFFICE.

WILLIAM H. EDWARDS, OF MOLINE, ILLINOIS.

Letters Patent No. 83,944, dated November 10, 1868.

IMPROVEMENT IN JOINT AND COUPLING FOR CULTIVATORS.

The Schedule referred to in these Letters Patent and making part of the same.

*To all whom it may concern:*

Be it known that I, WILLIAM H. EDWARDS, of Moline, in the county of Rock Island, and State of Illinois, have invented certain new and useful Improvements in Joints and Couplings for Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to cultivators, and consists in the construction and arrangement of certain novel mechanical devices for adjusting vertically and laterally the front ends of the shovel-beams, so as to regulate the depth of plowing as desired.

In the drawings—

Figure 1 is a side view, with one of the wheels taken off;

Figure 2 is a top plan view;

Figure 3 is a sectional view of a part detached, on the line x–x of fig. 2; and

Figure 4 is a view of a part of one of the shovel-beams, with the coupling-device attached, and partly broken away.

My cultivator-frame consists of two horizontal bars, A B, connected at each end to inclined supports C, and on opposite sides of the same, so as to be parallel to and a short distance vertically from each other, as shown in fig. 1. To the lower end of the inclined support C are attached the axles a, on which are mounted the wheels K.

Centrally between the bars A B, the tongue-beam D is inserted, with its rear end projecting far enough to allow the shovel-beams F to be suspended on the hooks l, by eyes or staples m, and is firmly secured to the frame by a bolt, b, and braces c, as clearly shown in fig. 2.

To the under side of the tongue-beam D, and in the rear of the bars A B, the evener E is connected, so as to turn freely on the connecting-bolt n, and has each of its ends connected to vertical bars e by a link, d. The lower ends of these bars e are jointed to the forward ends of projecting supports f, which are rigidly fastened to the lower ends of the inclined supports c, as shown in figs. 1 and 2. As the horses are attached to the bars e, this arrangement provides for equalizing the draught.

On each side of the front ends of the shovel-beams F, I secure metal plates G by bolts, and shape them as shown in all the figures. These metal plates G are so secured that their front ends project beyond the end of the shovel-beams, and between their projecting ends I insert two clasp-plates, g, and hold them together by a pin or bolt, o.

The inside or interior surfaces of the plates G are provided with shoulders, which the interior of the clasping-plates g are made to fit, and the whole arranged to form a joint, without the clasping-plates g bearing on the pin o, as clearly shown in fig. 3.

The clasping-plates g are formed as shown in all the figures, and have their front ends so constructed that, when united, there will be a circular opening between them, with a circular recess or chamber in the centre. In this circular opening I place a vertical metal rod, H, provided with a small shoulder, h, to fit into the recess within the clasping-plates, so as to allow it to turn freely, without allowing any vertical motion when the plates are fastened at their front ends by the bolt i, all as clearly shown in fig. 4.

The metal rods H extend up vertically in the rear of the bars A B, in which I make a series of semicircular recesses, p, for receiving them. When placed in any one of these recesses, I hold it in place by an eye-bolt, I, the eye of which passes over the rod, and the shank extends between the bars A B, and through a metal plate, J, arranged to bear against the front sides of the bars A B.

The end of the bolt I is provided with a thread-screw and a nut, k, so that the rod H, when adjusted in any of the recesses p, and vertically, as desired, may be firmly secured in its place.

By the use of these devices, it will be seen that the shovel-beams are provided with a coupling and joint, which permit them to move horizontally or vertically, as may be desired, and also with a novel device for adjusting, both vertically and horizontally, their front ends, so as to cultivate shallow or deep, as may be required, and in rows of different distances from each other.

Having thus described my invention,

What I claim is—

1. The joint and coupling for cultivators, consisting of the side plates G, the clasping-plates g, and vertical rod H, all constructed and arranged substantially as herein described, and for the purpose set forth.

2. The method of connecting the vertical rod H to the frame of the cultivator by means of the eye-bolt I and plate J, or their equivalents, substantially as herein described, for vertically and laterally adjusting the shovel-beams, as set forth.

WM. H. EDWARDS.

Witnesses:
H. WOODWORTH,
S. A. KERNS.